United States Patent [19]
Goto

[11] Patent Number: 5,867,336
[45] Date of Patent: Feb. 2, 1999

[54] APPARATUS AND METHOD FOR ROTARY HEAD HEIGHT MEASUREMENT

[75] Inventor: Taku Goto, Osaka, Japan

[73] Assignee: Matsushita Electric Industrial Co., Ltd., Osaka, Japan

[21] Appl. No.: 611,743

[22] Filed: Mar. 6, 1996

[30] Foreign Application Priority Data

Mar. 14, 1995 [JP] Japan .................................... 7-054429

[51] Int. Cl.⁶ .................................................. G11B 21/04
[52] U.S. Cl. ........................ 360/75; 360/77.16; 360/78.02
[58] Field of Search ............................ 360/77.13, 77.02, 360/76, 77.16, 75, 106, 109, 77.15, 78.02

[56] References Cited

U.S. PATENT DOCUMENTS

| | | | |
|---|---|---|---|
| 4,860,132 | 8/1989 | Lorteije | 360/21 X |
| 5,072,319 | 12/1991 | Kohri et al. | 360/77.16 |
| 5,101,303 | 3/1992 | Maeda et al. | 360/75 |
| 5,206,770 | 4/1993 | Hashi et al. | 360/75 |
| 5,241,434 | 8/1993 | Okamoto et al. | 360/77.16 |
| 5,274,515 | 12/1993 | Furuyama | 360/77.13 X |
| 5,313,347 | 5/1994 | Mitsuhashi | 360/77.16 |
| 5,384,676 | 1/1995 | Yokoyama et al. | 360/77.16 X |
| 5,395,066 | 3/1995 | Yokoyama et al. | 360/71 X |
| 5,432,658 | 7/1995 | Kajita et al. | 360/109 |
| 5,450,256 | 9/1995 | Murata et al. | 360/75 |
| 5,519,544 | 5/1996 | Hara | 360/64 X |

FOREIGN PATENT DOCUMENTS

| | | |
|---|---|---|
| 3171413 | 7/1991 | Japan . |
| 5120647 | 5/1993 | Japan . |
| 5120650 | 5/1993 | Japan . |

*Primary Examiner*—Aristotelis M. Psitos
*Assistant Examiner*—K. Wong
*Attorney, Agent, or Firm*—Louis Woo

[57] ABSTRACT

In a rotary head height measuring system 50, a peak position detector 51 detects peak positions of output signals of rotary heads 62–65 mounted on a magnetic recording and reproduction system 60. A time difference detector 52 detects a time difference $\Delta t$ between specific peaks based on the peak positions detected by the peak position detector means 51. An altitudinal dislocation calculating means 53 calculates an altitudinal dislocation $\Delta h$ of a concerned rotary head based on the time difference $\Delta t$ obtained by the time difference detector 52. During the measurement of rotary head height, a tape in the magnetic recording and reproduction system 60 is driven at a specific travelling speed which is k times a regular reproduction speed of magnetic recording and reproduction system, where k is not larger than −1 or not smaller than 2.

20 Claims, 7 Drawing Sheets

APPARATUS AND METHOD FOR ROTARY HEAD HEIGHT MEASUREMENT

BACKGROUND OF THE INVENTION

1. Field of the Invention

This invention generally relates to a method and an apparatus for measuring the height of rotary heads mounted in a magnetic recording & reproduction system.

2. Prior Art

There is known a method of measuring the height of a rotary head mounted or equipped on a rotary head unit in a magnetic recording & reproduction system without removing the rotary head unit itself from the magnetic recording & reproduction system. Recently, size of such a measuring system and manufacturing costs for it have been steadily reduced. For example, Unexamined Japanese Patent Application No. HEI 5-120650, published in 1993, discloses a system capable of measuring the height of a rotary head using rotary head output signal obtained in the still reproduction mode of the magnetic recording & reproduction system, as shown in FIGS. 9 through 12.

FIG. 9 is a view showing an arrangement of a rotary head device where a plurality of rotary heads 92–95 are provided an a rotary drum 91 equipped in a magnetic recording & reproduction system 100. As shown in FIG. 10, the magnetic recording & reproduction system 100 is associated with a conventional rotary head height measuring system 200 which comprises a detecting circuit 201, an A/D converter 202 and a computer 203. Rotary heads 92 and 94 belong to a second channel (i.e. CH2) having the same azimuth angle, while rotary heads 93 and 95 belong to a first channel (i.e. CH1) having the same azimuth angle but opposite to the azimuth angle of the rotary heads 92 and 94.

Meanwhile, rotary heads 92 and 93 are a couple of rotary heads belonging to channel B (i.e. CHB) and rotary heads 94 and 95 are another couple of rotary heads belonging to channel A. (CHA). Channel A and channel B are alternately selected or switched in response to a head switching signal.

An operation of the above-described conventional rotary head height measuring system will be explained hereinafter with reference to FIGS. 11 and 12. FIG. 11 is a view illustrating the locus or trajectory of rotary heads on a tape, used for explaining the operation of the conventional rotary head height measuring system 200. As shown in FIG. 11, numerous oblique tracks 72–76 are recorded consecutively on the surface of a tape 71.

A track, denoted by reference numeral 72, is recorded with the azimuth angle corresponding to the CH2 heads (i.e. rotary heads 92 and 94. A track, denoted by reference numeral 73, is recorded with the azimuth angle corresponding to the CH1 heads (i.e. rotary heads 93 and 95. Each track is administrated to have a predetermined width.

Reference numeral 74 represents the locus of rotary CH2 heads (i.e. rotary heads 92 and 94 in the still reproduction mode when these rotary heads 92 and 94 are positioned correctly at their predetermined regular height. Reference numeral 75 represents the locus of CH1 heads (i.e. rotary heads 93 and 95 in the still reproduction mode when these rotary heads 93 and 95 are positioned correctly at their predetermined regular height.

Meanwhile, reference numeral 76 represents the locus of rotary head 94 in the still mode when this rotary head 94, one of CH2 heads, is positioned lower than the predetermined regular height by an amount of $\Delta h3$.

FIG. 12 is a time chart showing respective outputs of rotary heads 92–95 in the still reproduction mode shown in FIG. 11. Reference numeral 81 represents the head switching signal whose output alternates at the same intervals between high (CHA) and low (CHB). This interval is referred to as head switching duration, hereinafter. Reference numeral 82 represents the output waveform of CH1 heads (i.e. rotary heads 93 and 95) obtained when these rotary heads 93 and 95 are precisely positioned at their predetermined regular height.

Reference numeral 83 represents the output waveform of CH2 heads (rotary heads 92 and 94) obtained when these rotary heads 92 and 94 are precisely positioned at their predetermined regular height. Reference numeral 84 represents the output waveform of the rotary head 94 obtained when this rotary head 94, one of the CH2 heads, is dislocated lower than the predetermined regular height by the amount of $\Delta h3$.

When the rotary head 94 (one of CH2 heads) is positioned lower than the predetermined regular height by the amount of $\Delta h3$, its locus 76 is deviated from the correct locus 74 as shown in FIG. 11. In such a case, the output peak of rotary head 64 is offset from its regular position by an amount of time difference $\Delta t5$ as shown in FIG. 12. Hence, the time difference between concerned two peaks of channel CH2 is differentiated.

T3'>T4'

The time difference $\Delta t5$ is expressed by the following equation.

$$\Delta t5=(T3'-T4')/2$$

In this conventional system, only one output peak appears on the rotary head signal within each head switching duration. The rotary heads and tracks recorded on the tape respectively correspond to two kinds of azimuth angles. Hence, a shift amount of the concerned output peak during a period of time from a building up of each head switching duration to its trailing edge corresponds to a change of the height of the rotary head, mounting two times the track width, as defined by the following equation.

$$\Delta h3/\Delta t5=2\times Tw/T$$

where Tw represents the track width, while T represents the time interval of each head switching duration; $T=(T1+T2)/2$.

Accordingly, the altitudinal dislocation $\Delta h3$ is obtained from the above-defined relationship.

$$\Delta h3=2\times Tw\times \Delta t5/T$$

As shown in FIG. 10, magnetic recording & reproduction system 100, when it operates in the still reproduction mode, sends the rotary head output signal to the rotary head height measuring system 200. The detecting circuit 201 and A/D converter 202 cooperatively detect each peak position of the rotary head output signal, and the computer 203 calculates the time difference $\Delta t5$ and obtains the altitudinal dislocation $\Delta h3$ referring to the above-described equation.

However, according to the above-described conventional rotary head height measuring system, there were problems derived from the nature of the still reproduction where the tape travelling speed was zero. In the magnetic recording & reproduction system, appropriate tension is normally applied on the tape when it travels, providing uniformity in the contact between the rotary head and the tape and assuring adequacy in the rotary head output signal.

On the contrary, when the tape is stopped in the still mode, tape tension cannot be stabilized and also tape restriction cannot be steady in the transverse direction of the tape travelling in the longitudinal direction thereof. As a result, contact between the rotary head and the tape is not uniform. As shown in FIG. 12, swelling or distortion 85 appears on the waveform of the rotary head output signal. Accordingly, it was not possible to obtain a correct peak time difference, resulting in the deterioration of measuring accuracy in the measurement of the rotary head height.

Furthermore, when the width of the rotary head is different from the width of the track recorded on the tape, the rotary head output signal may cause a flattened peak in its waveform, which will make it possible to detect the peak time difference accurately.

Still further, if a method of identifying the maximum output value as corresponding to a peak position is adopted in the case where the width of the rotary head is different from the width of the track recorded on the tape, it will encounter the problem that the maximum output value may be detected in a relatively wide zone in the vicinity of the actual peak position due to the flattened peak in the waveform, making it difficult to accurately find out the actual peak position.

SUMMARY OF THE INVENTION

Accordingly, in view of above-described problems encountered in the prior art, a principal object of the present invention is to provide a novel and excellent rotary head height measuring apparatus and method capable of measuring the peak time difference stably without suffering from swelling or distortion appearing on the waveform of the rotary head output signal, and capable of amending an altitudinal dislocation of the rotary head by taking account of the widthwise difference in the actual size of the rotary head, thereby assuring the measuring accuracy in the measurement of rotary head height.

In order to accomplish this and other related objects, a first aspect of the present invention provides a novel and excellent apparatus for measurement of rotary head height, associated with a magnetic recording & reproduction system having at least two rotary heads. This rotary head height measuring apparatus comprises peak position detecting means, time difference detecting means, altitudinal dislocation calculating means, and tape speed designating means. The peak position detecting means detects peak positions of output signals of the rotary heads. The time difference detecting means detects a time difference between specific peaks based on the peak positions detected by the peak position detecting means. The altitudinal dislocation calculating means obtains an altitudinal dislocation of a concerned rotary head based on the time difference obtained by the time difference detecting means. And, the tape speed designating means designates a specific tape travelling speed for the measurement of rotary head height, wherein the specific tape travelling speed is k times a regular reproduction speed of the magnetic recording & reproduction system, where k is not larger than −1 or not smaller than 2.

A second aspect of the present invention provides a novel and excellent rotary head height measuring apparatus associated with a magnetic recording & reproduction system having at least two rotary heads alternately switched at predetermined switching intervals, comprising: peak position detecting means for detecting peak positions of output signals of the rotary heads; time difference detecting means for detecting a time difference between specific peaks based on the peak positions detected by the peak position detecting means; altitudinal dislocation calculating means for calculating an altitudinal dislocation of a concerned rotary head based on the time difference obtained by the time difference detecting means; and tape speed designating means for designating a specific tape travelling speed assuring that a plurality of peaks appear on an output signal of each rotary head within each switching interval.

Furthermore, a third aspect of the present invention provides a novel and excellent method for measurement of rotary head height comprising the steps of: designating a specific travelling speed of a tape in a magnetic recording & reproduction system for the measurement of rotary head height; detecting peak positions of output signals of a plurality of rotary heads equipped in the magnetic recording & reproduction system; detecting a time difference between specific peaks based on the peak positions; and calculating an altitudinal dislocation of a concerned rotary head based on the time difference, wherein the specific travelling speed is k times a regular reproduction speed of the magnetic recording & reproduction system, where k is not larger than −1 or not smaller than 2.

Yet further, a fourth aspect of the present invention provides a novel and excellent rotary head height measuring method using a magnetic recording & reproduction system having at least two rotary heads alternately switched at predetermined switching intervals, comprising the steps of: designating a specific travelling speed of a tape in the magnetic recording & reproduction system for the measurement of rotary head height, the tape travelling speed assuring that a plurality of peaks appear on an output signal of each rotary head within each switching interval; detecting peak positions of output signals of the rotary heads; detecting a time difference between specific peaks based on the peak positions; and calculating an altitudinal dislocation of a concerned rotary head based on the time difference.

According to features of the preferred embodiments, it is preferable that the tape speed designating means designates a tape travelling speed used in a double-speed reproduction mode or faster special reproduction mode performed in the magnetic recording & reproduction system, or in a regular-speed reverse reproduction mode or faster reverse reproduction mode also performed in the magnetic recording & reproduction system.

The peak position detecting means calculates factors of two oblique lines defining each output peak of the output signals of the rotary heads, and identifies a true peak position based on the two oblique lines.

The altitudinal dislocation calculating means amends the altitudinal dislocation of the concerned rotary head based on a widthwise difference of actual size of the concerned rotary head.

The altitudinal dislocation calculating means calculates the altitudinal dislocation of the concerned rotary head using the following equation.

$$\Delta h = P \times A \times Tw \times \Delta t / T$$

where $\Delta h$ represents the altitudinal dislocation of the concerned rotary head;

P represents the number of peaks appearing on the output signal of each rotary head within each switching interval;

A represents the number of kinds of azimuth angles of the rotary heads;

Tw represents the track width;

$\Delta t$ represents the peak time difference; and

T represents each switching interval.

When there is a widthwise difference in actual size of the concerned rotary head, the altitudinal dislocation calculating means modifies the altitudinal dislocation $\Delta h$ according to the following equation.

$$\Delta h=(P\times A\times Tw\times \Delta t/T)-(\Delta W/2)$$

where $\Delta W$ represents the widthwise difference of in actual size of the concerned tape head.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
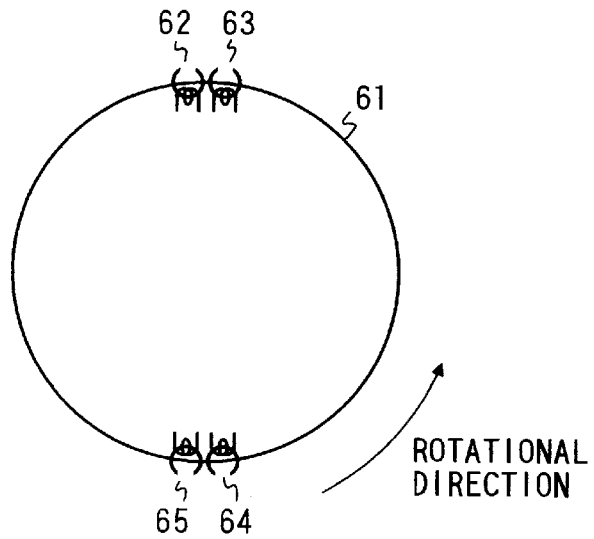
FIG. 1 is a view showing an arrangement of rotary heads equipped or mounted in a magnetic recording & reproduction system.

Preferred embodiments of the present invention will be explained in greater detail hereinafter, with reference to the accompanying drawings. Identical parts are denoted by an identical reference numeral throughout the views.

Figure 2:
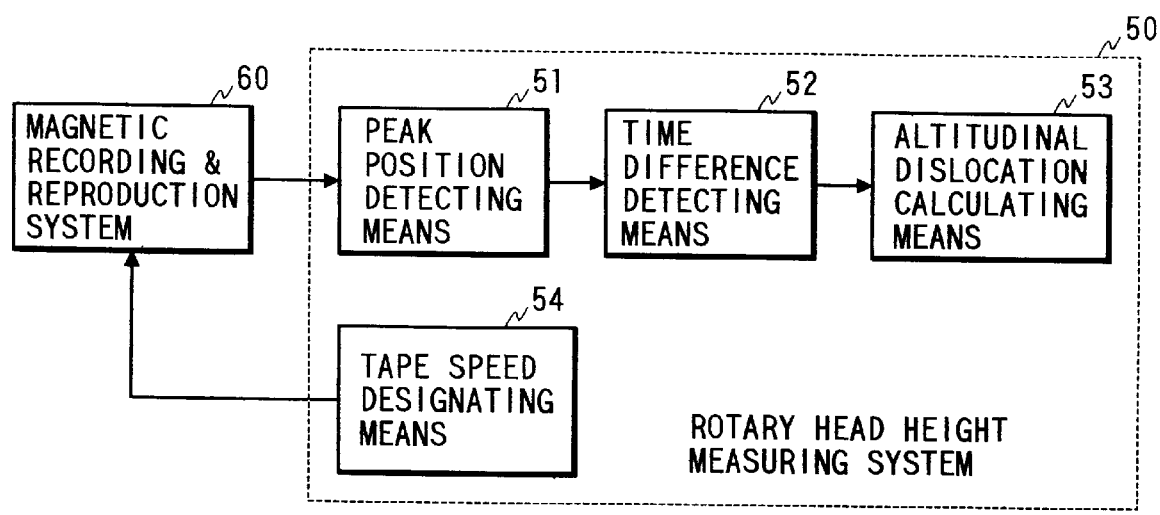
FIG. 2 is a diagram showing a schematic arrangement of a rotary head height measuring system in accordance with the present invention which is associated with the magnetic recording & reproduction system shown in FIG. 1.

FIG. 1 is a view showing an arrangement of rotary heads equipped or mounted in a magnetic recording & reproduction system. FIG. 2 is a diagram showing a schematic arrangement of a rotary head height measuring system in accordance with the present invention which is associated with the magnetic recording & reproduction system shown in FIG. 1.

As shown in FIG. 1, a plurality of rotary heads 62, 63, 64 and 65 are provided on the circumferential peripheral surface of the cylindrical body of a rotary drum 61. Rotary heads 62 and 64 belong to a second channel (i.e. CH2) having the same azimuth angle, while rotary heads 63 and 65 belong to a first channel (i.e. CH1) having the same azimuth angle but opposite to the azimuth angle of the rotary heads 62 and 64. Meanwhile, rotary heads 62 and 63 are a couple of rotary heads belonging to channel B (i.e. CHB) and rotary heads 64 and 65 are another couple of rotary heads belonging to channel A (CHA). Channel A and channel B are alternately selected or switched in response to a head switching signal.

As shown in FIG. 2, a magnetic recording & reproduction system 60, comprising rotary heads 62–65 disclosed in FIG. 1, is connected to a rotary head height measuring system 50 in accordance with one embodiment of the present invention.

The rotary head height measuring system 50 comprises a peak position detecting means 51, a time difference detecting means 52, an altitudinal dislocation calculating means 53 and a tape speed designating means 54.

Next, an operation of the rotary head height measuring system 50 will be explained with reference to FIGS. 3 and 4, in accordance with a first embodiment of the present invention.

Figure 3:
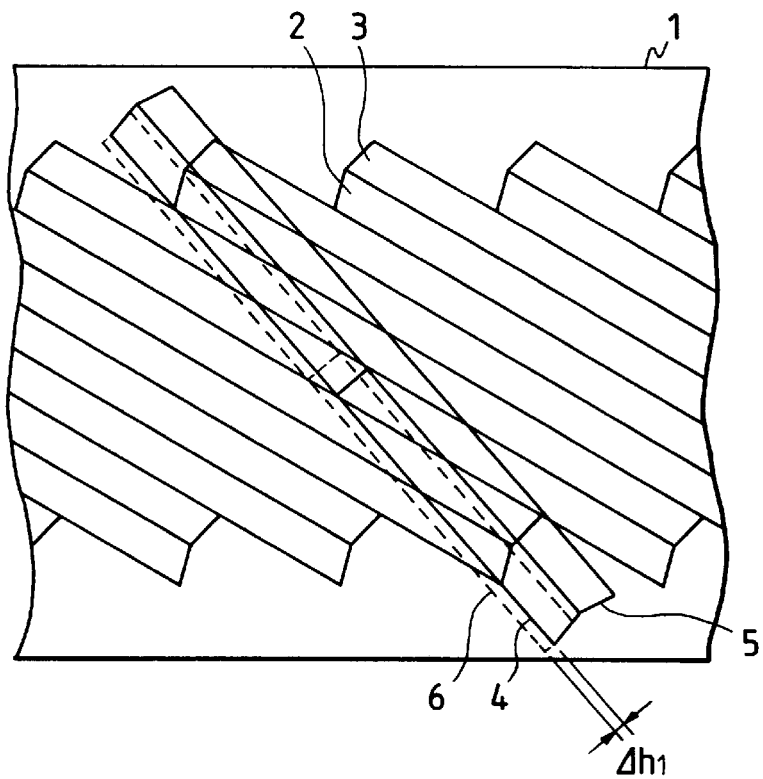
FIG. 3 is a view illustrating the locus or trajectory of rotary heads on a tape, used for explaining the operation of the rotary head height measuring system in accordance with a first embodiment of the present invention.

FIG. 3 is a view illustrating the locus or trajectory of rotary heads 62–65. As shown in FIG. 3, numerous oblique tracks are recorded consecutively on the surface of a tape 1. A track, denoted by reference numeral 2, is recorded with the azimuth angle corresponding to the CH2 heads (i.e. rotary heads 62 and 64). A track, denoted by reference numeral 3, is recorded with the azimuth angle corresponding to the CH1 heads (i.e. rotary heads 63 and 65). Each track is administrated to have predetermined width. Namely, tracks on a reference tape are shown.

Reference numeral 4 represents the locus of rotary CH2 heads (i.e. rotary heads 62 and 64) in the triple-speed reproduction mode when these rotary heads 62 and 64 are positioned correctly at their predetermined regular height. Reference numeral 5 represents the locus of CH1 heads (i.e. rotary heads 63 and 65) in the triple-speed reproduction mode when these rotary heads 63 and 65 are positioned correctly at their predetermined regular height.

Meanwhile, reference numeral 6 represents the locus of the rotary head 64 in the triple-speed mode when this rotary head 64, one of CH2 heads, is positioned lower than the predetermined regular height by an amount of $\Delta h1$.

Figure 4:
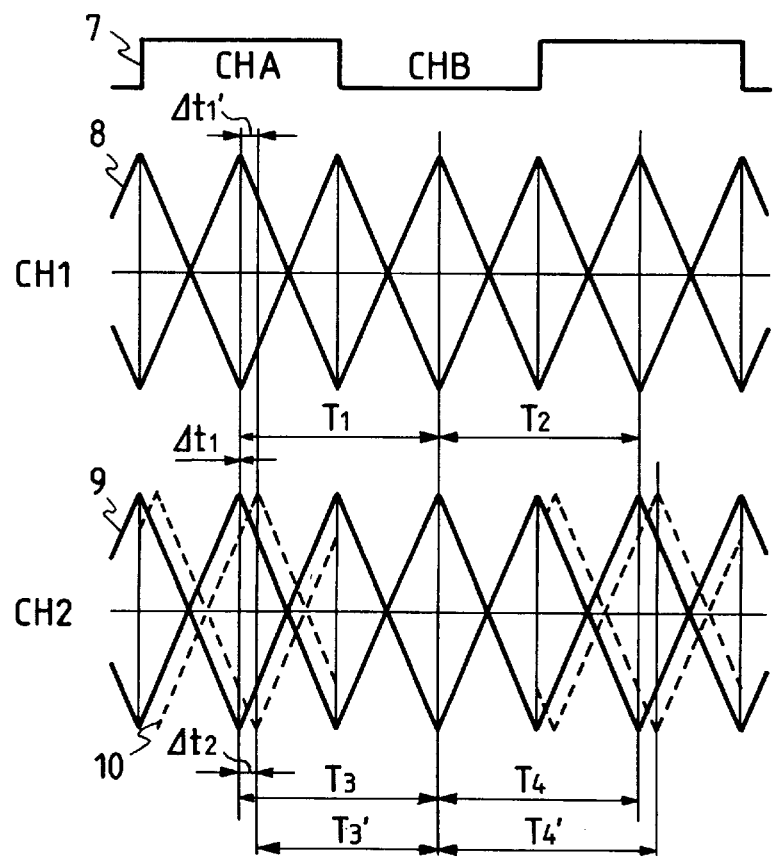
FIG. 4 is a time chart showing respective outputs of rotary heads in the triple-speed reproduction mode shown in FIG. 3.

FIG. 4 is a time chart showing respective outputs of rotary heads 62–65 in the triple-speed reproduction mode shown in FIG. 3. Reference numeral 7 represents the head switching signal whose output alternates at the same intervals between high (CHA) and low (CHB). This interval is referred to as head switching duration. Reference numeral 8 represents the output waveform of CH1 heads (i.e. rotary heads 63 and 65) obtained when these rotary heads 63 and 65 are precisely positioned at their predetermined regular height.

Reference numeral 9 represents the output waveform of CH2 heads (rotary heads 62 and 64) obtained when these rotary heads 62 and 64 are precisely positioned at their predetermined regular height. Reference numeral 10 represents the output waveform of the rotary head 64 obtained when this rotary head 64, one of the CH2 heads, is dislocated lower than the predetermined regular height by an amount of $\Delta h1$.

When each of two channels CHA and CHB has two dedicated rotary heads having different azimuth angles as shown in this embodiment, two output peaks appear on the rotary head signal within a period of time corresponding to each head switching duration in the triple-speed reproduction mode. Hence, a time difference is obtained by detecting specific peaks of output signals of rotary heads 62, 63, 64 and 65 which are in the same positional relationship.

When all of rotary heads 62–65 are correctly positioned at their predetermined regular height and cause loci 4 and 5 on the tape 1 as shown in FIG. 3, the time difference (or time interval) between corresponding two peaks becomes the same value between output signals of rotary heads 62, 63, 64 and 65.

$$T1=T2=T3=T4$$

Furthermore, no time difference or delay is caused between CH1 and CH2 signals.

$$\Delta t1=0$$

However, when the rotary head 64 (i.e. one of CH2 heads) is positioned lower than the predetermined regular height by the amount of $\Delta h1$, its locus 6 is deviated from the correct locus 4 as shown in FIG. 3. In such a case, the output peak of rotary head 64 is offset from its regular position by an amount of time difference $\Delta t2$ as shown in FIG. 4. Hence, the time difference between concerned two peaks of channel CH2 is differentiated.

$$T3'<T4'$$

The time difference $\Delta t2$ is expressed by the following equation.

$$\Delta t2=(T4'-T3')/2$$

Furthermore, a time difference $\Delta t1'(=\Delta t2)$ is caused between CH1 and CH2 channels.

In this first embodiment, two output peaks appear on the rotary head signal within each head switching duration. The rotary heads and tracks recorded on the tape respectively correspond to two kinds of azimuth angles. Hence, a shift amount of the concerned output peak during a period of time from a building up of each head switching duration to its trailing edge corresponds to a change of the height of the rotary head, mounting four times the track width, as defined by the following equation.

$$\Delta h1/\Delta t2=4\times Tw/T$$

where Tw represents the track width, while T represents the time interval of each head switching duration; $T=(T1+T2)/2$.

Accordingly, the altitudinal deviation $\Delta h1$ is obtained from the above-defined relationship.

$$\Delta h1=4\times Tw\times\Delta t2/T \quad (1)$$

Although this embodiment assumes that the height of rotary head 64 is dislocated by $-\Delta h1$ from the predetermined regular height, the above relationship can be derived in the same manner in other cases, by considering the peak time differences T1, T2, T3 and T4 of respective rotary heads and time difference $\Delta t1$ between CH1 and CH2 channels. For example, when the rotary head 64 is dislocated in the opposite direction (i.e. by the deviation $+\Delta h1$), or even when the rotary head other than rotary head 64 is dislocated, the altitudinal dislocation $\Delta h1$ will be obtained in the same manner.

Figure 5:
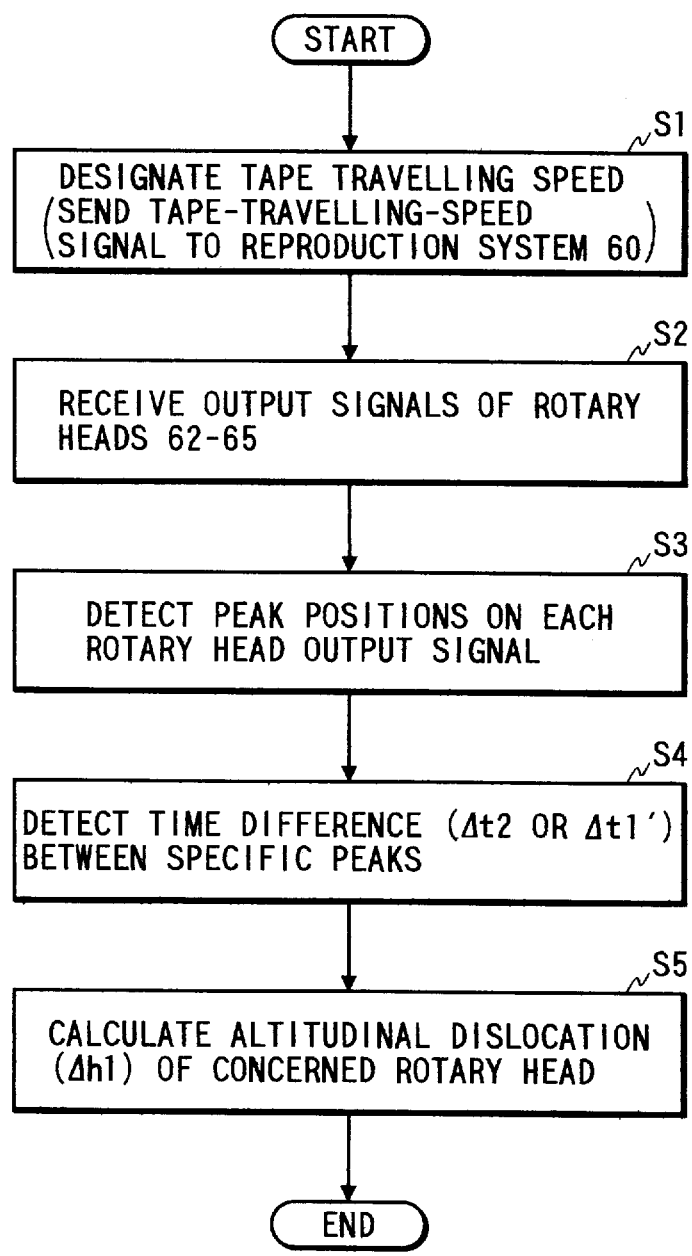
FIG. 5 is a flow chart showing the operation of the rotary head height measuring system.

As shown in the flow chart of FIG. 5, for performing the rotary head height measurement operation in accordance with the present invention, the tape speed designating means 54 designates the tape travelling (reproduction) speed prior to the measurement of the actual rotary head height and sends a tape-traveling-speed designating signal to the magnetic recording & reproduction system 60 (Step S1). Namely, the tape speed designating means 54 has a function of designating a specific tape travelling speed for the measurement of rotary head height. Although this embodiment designates the specific tape travelling speed by means of an electrical signal, transmission of the designated specific tape travelling speed to the magnetic recording & reproduction system 60 can be performed by any other means, such as radio wave, indication or notice to the operator, or any other available means bringing the same effect.

Then, the rotary head height measuring system 50 receives the output signals of rotary head 62–65 from the magnetic recording & reproduction system 60 (Step S2). The peak position detecting means 51 detects peak positions on each rotary head output signal based on the output signals of rotary heads 62–65 received from the magnetic recording & reproduction system 60 (Stp S3). The time difference detecting means 52 detects the time differences $\Delta t2$ or $\Delta t1'$ between specific peaks based on the peaks detected by the peak position detecting means 51 (Step S4). The altitudinal dislocation calculating means 53 calculates a dislocation $\Delta h1$ of the concerned rotary head in the altitudinal direction referring to the above-described equation (1) based on time difference $\Delta t2$ or $\Delta t1'$ detected by the time difference detecting means 52 (Step S5).

The travelling (reproduction) speed, to be designated in step S1, is a value capable of assuring that a plurality of peaks appear on the rotary head output signal within each head switching duration. Such a travelling speed will be obtained in the double-speed reproduction mode or faster reproduction mode, or in the regular-speed reverse reproduction mode or faster reverse reproduction mode. Needless to say, the double-speed reproduction mode has a tape travelling speed twice as fast as the regular reproduction mode. The regular-speed reverse reproduction mode has the same but opposite-directional tape travelling speed.

In short, the specific tape travelling speed, to be designated by the tape speed designating means 54 in step S1, is generally defined as being k times the regular reproduction speed of the magnetic recording & reproduction system 60, where k is not larger than $-1$ or not smaller than 2 (i.e. $k \leq -1$ or $2 \leq k$).

The relationship between the number of peaks appearing on the rotary head output signal within each of the head switching duration and the tape travelling speed is generally expressed by the following equation.

$$\Delta h/\Delta t=P\times A\times Tw/T$$

where
$\Delta h$ represents the altitudinal dislocation of the concerned rotary head;
$\Delta t$ represents the peak time difference;
P represents the number of peaks appearing on the rotary head output signal within each head switching duration;
A represents the number of kinds of azimuth angles;
Tw represents the track width; and
T represents each head switching duration.

Accordingly, the altitudinal dislocation of the concerned rotary head can be generally defined by the following equation.

$$\Delta h=P\times A\times Tw\times\Delta t/T \quad (2)$$

As apparent from the foregoing description, the first embodiment uses the tape travelling (reproduction) speed sufficiently fast to stabilize the tape travelling restriction position and tape tension, to obtain correct diamond or pantographic waveform in each rotary head output signal free from swelling and distortion. Hence, the rotary head height measuring apparatus & method of the first embodiment make it possible to easily identify each peak position on the reproduction output signal and to stably obtain an accurate peak time difference $\Delta t$ ($\Delta t2$ or $\Delta t1'$) thereby, improving the reliability and accuracy in the measurement of rotary head height.

Next, another operation of the rotary head height measuring system 50 will be explained with reference to FIGS. 6 and 7, in accordance with a second embodiment of the present invention. The second embodiment is characterized in that the actual width of the rotary head is taken into consideration in the measurement of rotary head height.

Figure 6:
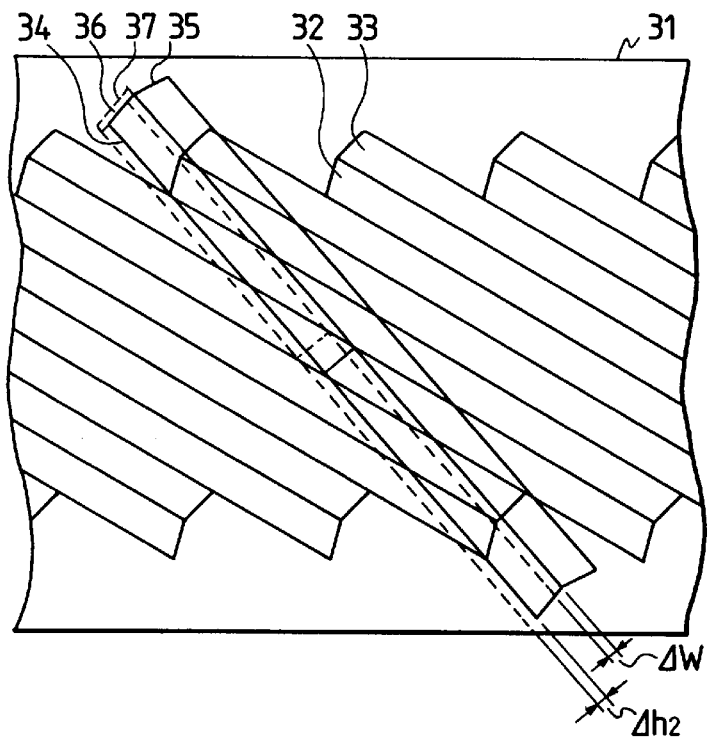
FIG. 6 is a view illustrating the locus or trajectory of rotary heads on a tape, used for explaining the operation of the rotary head height measuring system in accordance with a second embodiment of the present invention.

FIG. 6 is a view illustrating the locus or trajectory of rotary heads 62–65. As shown in FIG. 6, numerous oblique tracks are recorded on the surface of a tape 31. A track, denoted by reference numeral 32, is recorded with the azimuth angle corresponding to the CH2 heads (i.e. rotary heads 62 and 64). A track, denoted by reference numeral 33, is recorded with the azimuth angle corresponding to the CH1 heads (i.e. rotary heads 63 and 65). The width of each track is administrated to be a predetermined value.

Reference numeral 34 represents the locus of CH2 heads (i.e. rotary heads 62 and 64) in the triple-speed reproduction mode when these rotary heads 62 and 64 are precisely positioned at their predetermined regular height. Reference numeral 35 represents the locus of CH1 heads (i.e. rotary heads 63 and 65) in the triple-speed reproduction mode when these rotary heads 63 and 65 are precisely positioned at their predetermined regular height.

Meanwhile, reference numeral 36 represents the locus of rotary head 64 in the triple-speed mode when this rotary head 64, one of CH2 heads, is positioned lower than the predetermined regular height by the amount of $\Delta h1$.

Figure 7:
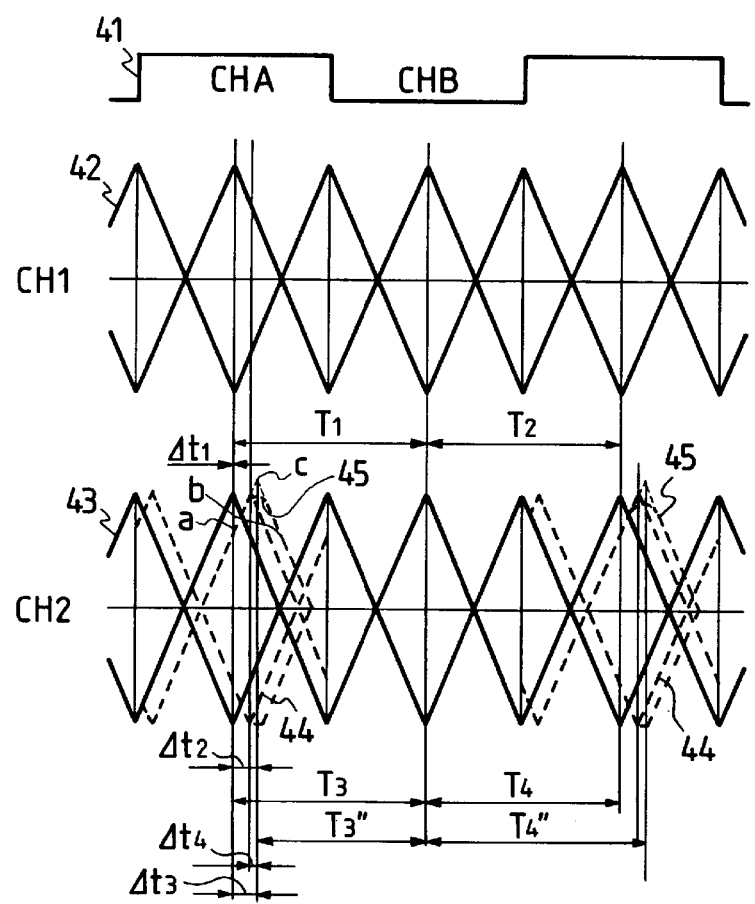
FIG. 7 is a time chart showing respective outputs of rotary heads in the triple-speed reproduction mode shown in FIG. 6.

FIG. 7 is a time chart showing respective outputs of rotary heads 62–65 in the triple-speed reproduction mode shown in FIG. 6. Reference numeral 41 represents the head switching signal whose output alternates at the same intervals between high (CHA) and low (CHB). This interval is referred to as head switching duration.

Reference numeral 42 represents the output waveform of CH1 heads (i.e. rotary heads 63 and 65) obtained when these rotary heads 63 and 65 are precisely positioned at their predetermined regular height. Reference numeral 43 represents the output waveform of CH2 heads (rotary heads 62 and 64) obtained when these rotary heads 62 and 64 are precisely positioned at their predetermined regular height. Reference numeral 44 represents the output waveform of the rotary head 64 obtained when this rotary head 64, one of the CH2 heads, is dislocated lower than the predetermined regular height by an amount of $\Delta h2$ and the width of the rotary head 64 is wider than the predesignated width by an amount of $\Delta W$.

When the width of rotary head 64 is wider than the regular width by $\Delta W$ as shown by the locus 37 in FIG. 6, the waveform of the rotary head output signal will have a flattened peak as denoted by reference numeral 45 in FIG. 7. More specifically, the normal output peak forms a correct steep triangle, whereas the shape of the flattened output peak 45 is a trapezoid. If such a flattened output peak is used for the measurement of rotary head height, identification of the actual apex of the flattened output peak will be difficult.

To solve this difficulty, the second embodiment of the present invention employs the following method in the detection of the peak position of the rotary head.

Figure 8:
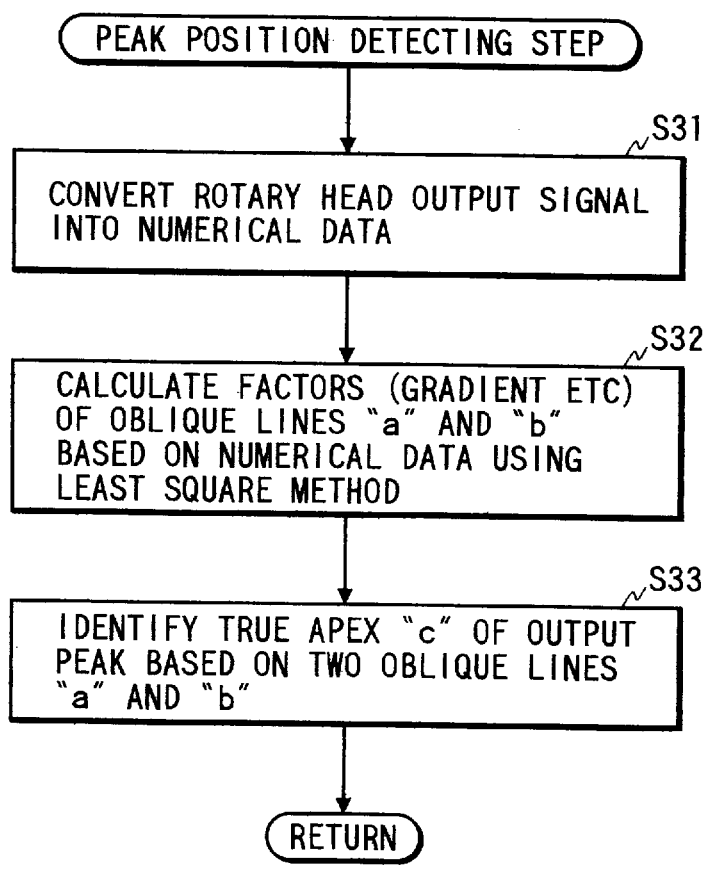
FIG. 8 is a flow chart showing the details of the peak position detecting operation in accordance with the second embodiment of the present invention.
Figure 9:
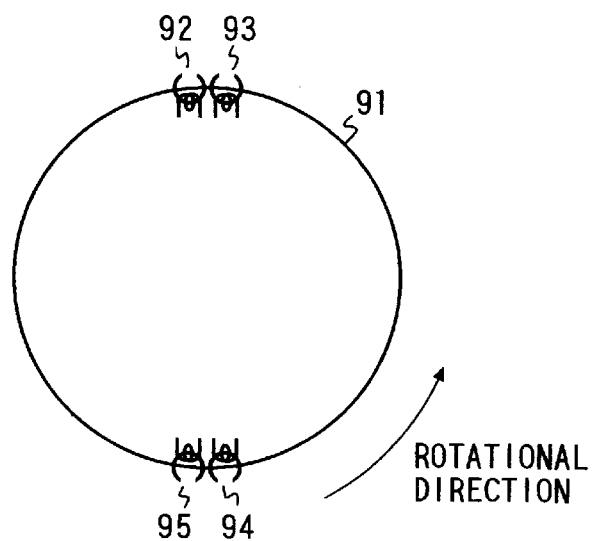
FIG. 9 is a view showing an arrangement of rotary heads equipped in a magnetic recording & reproduction system.
Figure 10:
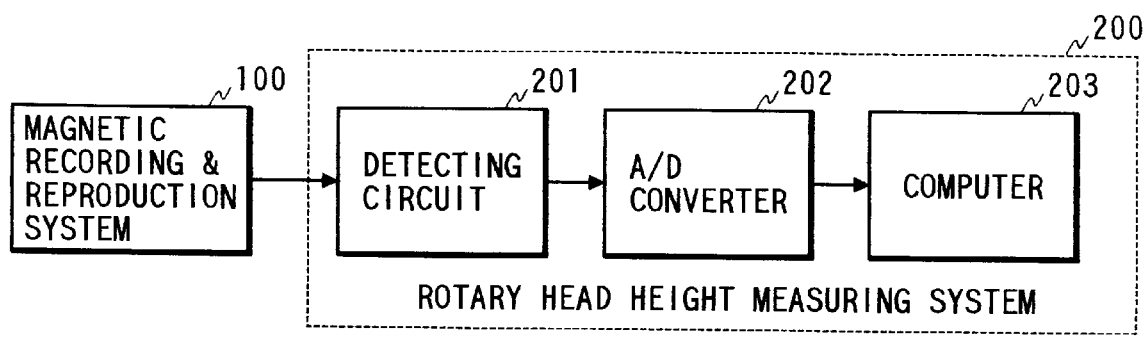
FIG. 10 is a diagram showing a schematic arrangement of a conventional rotary head height measuring system.
Figure 11:
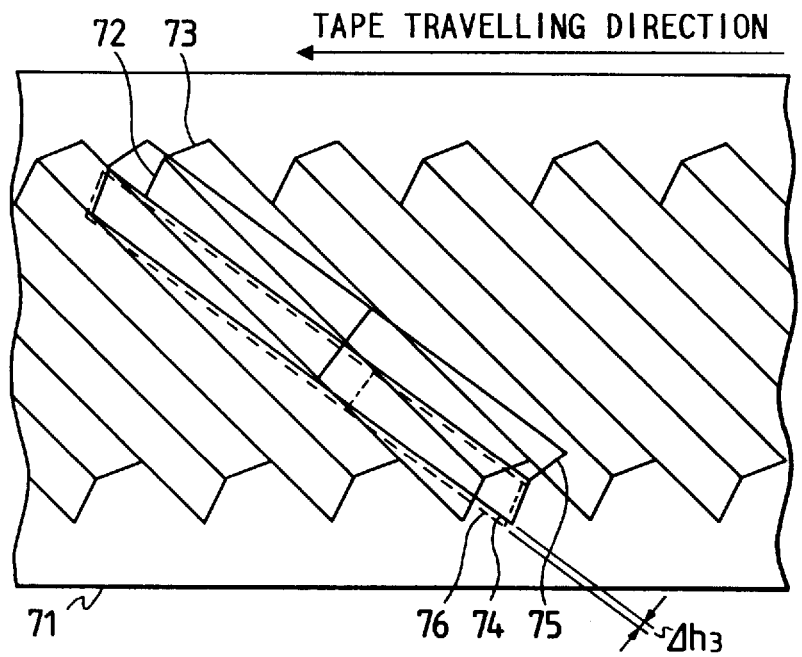
FIG. 11 is a view illustrating the locus or trajectory of rotary heads on a tape, used for explaining the operation of the conventional rotary head height measuring system.
Figure 12:
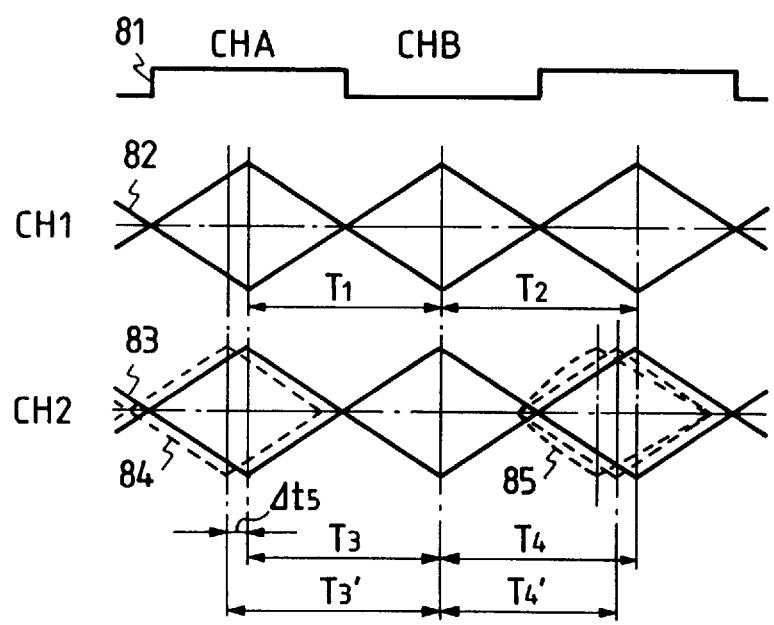
FIG. 12 is a time chart showing respective outputs of rotary heads in the still reproduction mode shown in FIG. 11.

The second embodiment modifies the step S3 in the flow chart of FIG. 5 in the following manner. Namely, as shown in the flow chart of FIG. 8, the peak position detecting means 51 converts the rotary head output signal 45 into numerical data (Step S31), then calculates the factors (gradient etc) of two oblique lines "a" and "b" defining each output peak based on the numerical data by using the least square method or. the like (Step S32), and finally identifies the true apex "c" of the output peak based on two oblique lines "a" and "b" (Step S33).

When the rotary head 64 (which has the predetermined regular width) is positioned lower than the predetermined regular height by the amount of $\Delta h2$, its locus 36 is deviated from the correct locus 34 as shown in FIG. 6. In such a case, the output peak of rotary head 64 is offset from its regular position by an amount of time difference $\Delta t2$ as shown in FIG. 7.

Hence, the altitudinal deviation $\Delta h2$ is expressed by the following relationship in the same manner as in the first embodiment.

$$\Delta h2 = 4 \times Tw \times \Delta t2 / T \qquad (3)$$

where Tw represents the track width, while T represents the time interval of each head switching duration; $T=(T3+T4)/2$.

Meanwhile, when the width of rotary head 64 is wider than the normal width by $\Delta W$ and the rotary head 64 is dislocated lower than the predetermined regular height, its locus 37 is further deviated from the correct locus 36 as shown in FIG. 6 In this case, the output peak of rotary head 64 is offset from its regular position by an amount of time difference $\Delta t3$ as shown in FIG. 7. More specifically, the widthwise difference in the actual size of the rotary head causes a time difference $\Delta t4$ ($=\Delta t3-\Delta t2$) even if the altitudinal deviation is the same value (i.e. $\Delta h2$).

Considering such a time difference $\Delta t4$ derived from the widthwise difference in the actual size of the rotary head, the second embodiment of the present invention corrects the above equation (3) in the following manner.

$$\Delta h2 = 4 \times Tw \times (\Delta t3 - \Delta t4)/T = (4 \times Tw \times \Delta t3/T) + K \qquad (4)$$

where, $K = -4 \times Tw \times \Delta t4/T$

Accordingly, when the relationship between K and $\Delta W$ is known, the altitudinal dislocation of the rotary head can be accurately obtained by adding a correction value corresponding to $\Delta W$, even if the concerned rotary head has a widthwise different compared with the predetermined value.

When the width of rotary head is wider than the regular width Tw by $\Delta W$, the time T/4 is an expandable time width for the apex portion of the rotary head output. Now it is assumed that the previous method using oblique lines "a" and "b" constituting the triangular waveform of the rotary head output signal is used to detect the peak position. In this case, a time difference T/8 will be caused between the peak to be obtained when the width of the concerned rotary head is $Tw + \Delta W$ and the peak to be obtained when the width of the concerned rotary head is Tw. Thus, the following relationship is derived.

$$\Delta W / \Delta t4 = Tw/(T/8)$$

Accordingly, time difference $\Delta t4$ is expressed by the following equation.

$$\Delta t4 = \Delta W \times T / (8 \times Tw) \qquad (5)$$

From the equation (5), the value of constant K is expressed by the following equation.

$$K = -\Delta W/2$$

Accordingly, when the concerned rotary head is wider than the regular width Tw by amount $\Delta W$, the altitudinal deviation of this rotary head is determined by the following equation. Namely, the above equation (4) can be rewritten into the following equation.

$$\Delta h2 = (4 \times Tw \times \Delta t3/T) - (\Delta W/2) \qquad (6)$$

This equation is further rewritten into a general form using the generalized equation (2) obtained in the first embodiment.

$$\Delta h = (P \times A \times Tw \times \Delta t/T) - (\Delta W/2) \qquad (7)$$

where $\Delta h$ represents the altitudinal dislocation of the concerned rotary head;

P represents the number of peaks appearing on the rotary head output signal within each head switching duration;

A represents the number of kinds of azimuth angles;

Tw represents the track width;

$\Delta t$ represents the peak time difference;

T represents each head switching duration; and $\Delta W$ represents a widthwise difference in actual size of this concerned rotary head.

In this manner, the second embodiment of the present invention makes it possible to accurately calculate the altitudinal dislocation of the concerned rotary head by taking account of the widthwise difference $\Delta W$ in the size of the concerned rotary head.

Although the second embodiment assumes that the width of rotary head 64 is wider than the normal one by $\Delta W$, the above-described relationship for obtaining the altitudinal dislocation can be derived in the same manner in other cases by considering the widthwise difference $\Delta W$, peak time differences T1, T2, T3 and T4 of respective rotary heads and time difference $\Delta t3$ between CH1 and CH2 channels. For example, when the rotary head 64 has a narrow width, or even when the rotary head has a different width and is other than a rotary head, the altitudinal dislocation $\Delta h2$ will be obtained in the same manner.

As apparent from the foregoing description, in addition to the effect of the first embodiment, the second embodiment of the present invention causes the peak position detecting means 51 to detect the true apex of the peak position even when the waveform of the rotary head output signal is flattened due to the widthwise difference in the actual size of the rotary head by using an unique method, and further causes the altitudinal dislocation calculating means 53 to perform the amendment in accordance with the widthwise difference in the actual size of the concerned rotary head. Hence, the second embodiment can improve the accuracy and reliability in the measurement of rotary head height.

Accordingly, the present invention provides a novel and excellent rotary head height measuring apparatus and method capable of measuring the peak time difference stably without suffering from swelling or distortion appearing on the waveform of the rotary head output signal, and capable of amending an altitudinal dislocation of the rotary head by taking account of the widthwise difference in the actual size of the rotary head, thereby assuring the measuring accuracy in the measurement of rotary head height.

As this invention may be embodied in several forms without departing from the spirit of essential characteristics thereof, the present embodiments as described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. An apparatus for measurement of rotary head height, associated with a magnetic recording and reproduction system having at least two rotary heads, comprising:

peak position detecting means for detecting peak positions of output signals of said rotary heads;

time difference detecting means for detecting a time difference between specific peaks based on the peak positions detected by said peak position detecting means;

altitudinal dislocation calculating means for calculating an altitudinal dislocation of a one of said rotary heads based on the time difference obtained by said time difference detecting means; and tape speed designating means for designating a specific tape travelling speed for the measurement of the rotary head height, wherein said specific tape travelling speed is k times a reverse or regular reproduction speed of said magnetic recording and reproduction system, where k is not larger than −1 or not smaller than 2.

2. The rotary head height measuring apparatus defined by claim 1, wherein said tape speed designating means designates a tape travelling speed used in a double-speed reproduction mode or a faster special reproduction mode performed in said magnetic recording & reproduction system.

3. The rotary head height measuring apparatus defined by claim 1, wherein said tape speed designating means designates a tape travelling speed used in a regular-speed reverse reproduction mode or a faster reverse reproduction mode performed in said magnetic recording & reproduction system.

4. The rotary head height measuring apparatus defined by claim 1, wherein said peak position detecting means calculates factors of two oblique lines defining each output peak of said output signals of said rotary heads, and identifies a true peak position based on said two oblique lines.

5. The rotary head height measuring apparatus defined by claim 1, wherein said altitudinal dislocation calculating means amends the altitudinal dislocation of said concerned rotary head based on a widthwise difference of actual size of said one rotary head.

6. A rotary head height measuring apparatus associated with a magnetic recording & reproduction system having at least two rotary heads alternately switched at predetermined switching intervals, comprising:

peak position detecting means for detecting peak positions of output signals of said rotary heads;

time difference detecting means for detecting a time difference between specific peaks based on the peak positions detected by said peak position detecting means;

altitudinal dislocation calculating means for calculating an altitudinal dislocation of a one of said rotary heads based on the time difference obtained by said time difference detecting means; and tape speed designating means for designating a specific tape travelling speed assuring that a plurality of peaks appear on an output signal of each rotary head within each switching interval.

7. The rotary head height measuring apparatus defined by claim 6, wherein said peak position detecting means calculates factors of two oblique lines defining each output peak of said output signals of said rotary heads, and identifies a true peak position based on said two oblique lines.

8. The rotary head height measuring apparatus defined by claim 6, wherein said altitudinal dislocation calculating means amends the altitudinal dislocation of said one rotary head based on a widthwise difference of actual size of said concerned rotary head.

9. The rotary head height measuring apparatus defined by claim 6, wherein said altitudinal dislocation calculating means calculates the altitudinal dislocation of said one rotary head using the following equation:

$$\Delta h = P \times A \times Tw \times \Delta t / T$$

where $\Delta h$ represents the altitudinal dislocation of said one rotary head;

P represents the number of peaks appearing on the output signal of each rotary head within each switching interval;

A represents the number of kinds of azimuth angles of said rotary heads;

Tw represents the track width;

$\Delta t$ represents the peak time difference; and

T represents each switching interval.

10. The rotary head height measuring apparatus defined by claim 6, wherein said altitudinal dislocation calculating means calculates the altitudinal dislocation of said one rotary head using the following equation:

$$\Delta h = (P \times A \times Tw \Delta t / T) - (\Delta W / 2)$$

where $\Delta h$ represents the altitudinal dislocation of said one rotary head;

P represents the number of peaks appearing on the output signal of each rotary head within each switching interval;

A represents the number of kinds of azimuth angles of said rotary heads;

Tw represents the track width;

$\Delta t$ represents the peak time difference;

T represents each switching interval; and $\Delta W$ represents a widthwise difference in actual size of said one rotary head.

11. A method for measurement of rotary head height comprising the steps of:

designating a specific travelling speed of a tape in a magnetic recording and reproduction system for the measurement of rotary head height;

detecting peak positions of output signals of a plurality of rotary heads equipped in said magnetic recording and reproduction system;

detecting a time difference between specific peaks based on said peak positions; and calculating an altitudinal dislocation of a one of said rotary heads based on said time difference, wherein said specific travelling speed is k times a reverse or regular reproduction speed of said magnetic recording and reproduction system, where k is not larger than −1 or not smaller than 2.

12. The rotary head height measuring method defined by claim 11, wherein said magnetic recording and reproduction system performs a double-speed reproduction mode or more faster special reproduction mode during the measurement of rotary head height.

13. The rotary head height measuring method defined by claim 11, wherein said magnetic recording and reproduction system performs a regular-speed reverse reproduction mode or a faster reverse reproduction mode during the measurement of rotary head height.

14. The rotary head height measuring method defined by claim 11, wherein said peak positions are calculated by obtaining factors of two oblique lines defining each output peak of said output signals of said rotary heads and then identifying a true peak position based on said two oblique lines.

15. The rotary head height measuring method defined by claim 11, wherein said altitudinal dislocation of said concerned rotary head is amended by taking account of a widthwise difference of actual size of said one rotary head.

16. A rotary head height measuring method using a magnetic recording and reproduction system having at least two rotary heads alternately switched at predetermined switching intervals, comprising the steps of:

designating a specific travelling speed of a tape in said magnetic recording & reproduction system for the measurement of rotary head height, said tape travelling speed assuring that a plurality of peaks appear on an output signal of each rotary head within each switching interval;

detecting peak positions of output signals of said rotary heads;

detecting a time difference between specific peaks based on said peak positions; and calculating an altitudinal dislocation of a one of said rotary heads based on said time difference.

17. The rotary head height measuring method defined by claim 16, wherein said peak positions are calculated by obtaining factors of two oblique lines defining each output peak of said output signals of said rotary heads and then identifying a true peak position based on said two oblique lines.

18. The rotary head height measuring method defined by claim 16, wherein said altitudinal dislocation of said concerned rotary head is amended by taking account of a widthwise difference of actual size of said one rotary head.

19. The rotary head height measuring method defined by claim 16, wherein said altitudinal dislocation of said concerned rotary head is calculated by using the following equation:

$$\Delta h = P \times A \times Tw \times \Delta t / T$$

where $\Delta h$ represents the altitudinal dislocation of said one rotary head;

P represents the number of peaks appearing on the output signal of said each rotary head within each switching interval;

A represents the number of kinds of azimuth angles of said rotary heads;

Tw represents the track width;

$\Delta t$ represents the peak time difference; and

T represents each switching interval.

20. The rotary head height measuring method defined by claim 16, wherein said altitudinal dislocation of said one rotary head is calculated by using the following equation:

$$\Delta h = (P \times A \times Tw \Delta t / T) - (\Delta W / 2)$$

where
- $\Delta h$ represents the altitudinal dislocation of said one rotary head;
- P represents the number of peaks appearing on the output signal of said each rotary head within each switching interval;
- A represents the number of kinds of azimuth angles of said rotary heads;
- Tw represents the track width;
- $\Delta t$ represents the peak time difference;
- T represents each switching interval; and
- $\Delta W$ represents a widthwise difference in actual size of said one rotary head.

* * * * *